United States Patent
Fontaine (10) Patent No.: US 10,422,438 B2
(45) Date of Patent: Sep. 24, 2019

(54) ELECTRO-PNEUMATIC CONVERTERS AND RELATED METHODS

(71) Applicant: Fisher Controls International LLC, Marshalltown, IA (US)

(72) Inventor: Michael Fontaine, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/491,533

(22) Filed: Apr. 19, 2017

(65) Prior Publication Data

US 2018/0306342 A1    Oct. 25, 2018

(51) Int. Cl.
  *F16K 31/06*    (2006.01)
  *F16K 31/42*    (2006.01)
  *F16K 27/02*    (2006.01)

(52) U.S. Cl.
  CPC ........ *F16K 31/0658* (2013.01); *F16K 27/029* (2013.01); *F16K 31/0606* (2013.01); *F16K 31/0627* (2013.01); *F16K 31/0675* (2013.01); *F16K 31/423* (2013.01)

(58) Field of Classification Search
  CPC .................................................. F16K 31/0658
  See application file for complete search history.

(56) References Cited

U.S. PATENT DOCUMENTS

| | | | | | |
|---|---|---|---|---|---|
| 3,351,093 | A | * | 11/1967 | Frantz ................. | F16K 31/0606 137/625.27 |
| 4,344,603 | A | * | 8/1982 | Hozumi .............. | F16K 31/0606 137/625.65 |
| 4,501,299 | A | * | 2/1985 | Klimowicz ......... | F16K 31/0606 137/625.5 |
| 4,848,727 | A | * | 7/1989 | Nanbu ................ | F16K 31/0658 137/625.65 |
| 4,887,769 | A | * | 12/1989 | Okamoto ........... | F02M 51/0671 239/493 |
| 4,896,861 | A | * | 1/1990 | Kojima ............... | F16K 31/0658 137/244 |
| 4,936,543 | A | * | 6/1990 | Kamibayasi ........ | F16K 31/0658 251/121 |

(Continued)

*Primary Examiner* — Marina A Tietjen
*Assistant Examiner* — Paul J Gray
(74) *Attorney, Agent, or Firm* — Hanley, Flight & Zimmerman, LLC (57) ABSTRACT

Example electro-pneumatic converters and related methods are disclosed herein. An example electro-pneumatic converter includes an axial passageway defined in a body between a first opening and a second opening. A supply port is formed by the first opening. The supply port is to receive pressurized fluid from a pressure supply source. The electro-pneumatic converter further includes an output port fluidly coupled to the axial passageway and a solenoid including a coil and an armature. The armature is disposed in and movable in the axial passageway. The armature is movable between a first position blocking the pressurized fluid from flowing through the axial passageway between the supply port and the output port and a second position allowing the pressurized fluid to flow through the axial passageway between the supply port and the output port.

20 Claims, 6 Drawing Sheets

(56) References Cited

U.S. PATENT DOCUMENTS

| | | | | |
|---|---|---|---|---|
| 6,405,757 B1* | 6/2002 | Jabcon | ................ | F16K 31/0606 |
| | | | | 137/625.65 |
| 2011/0121217 A1* | 5/2011 | Ohmi | .................. | F16K 31/0658 |
| | | | | 251/129.15 |
| 2014/0008557 A1* | 1/2014 | Vandamme | ............. | F16F 1/027 |
| | | | | 251/129.15 |

* cited by examiner

ELECTRO-PNEUMATIC CONVERTERS AND RELATED METHODS

FIELD OF THE DISCLOSURE

This disclosure relates generally to converters and, more particularly, to electro-pneumatic converters and related methods.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. These control valves are automated using a pressure-operated actuator that is controlled by a remote-operated field instrument. The field instrument communicates with a process control computer to command fluid flow changes within the valve to achieve a desired control strategy via pressure-operated actuators. Electro-pneumatic converters, such as current-to-pressure transducers, are commonly used in field instruments to provide a conversion of an electrical signal to volumetric flow or pressure output to control the actuator and, thus, the control valve.

SUMMARY

An example electro-pneumatic converter disclosed herein includes an axial passageway defined in a body between a first opening and a second opening. A supply port is formed by the first opening. The supply port is to receive pressurized fluid from a pressure supply source. The electro-pneumatic converter further includes an output port fluidly coupled to the axial passageway and a solenoid including a coil and an armature. The armature is disposed in and movable in the axial passageway. The armature is movable between a first position blocking the pressurized fluid from flowing through the axial passageway between the supply port and the output port and a second position allowing the pressurized fluid to flow through the axial passageway between the supply port and the output port.

An electro-pneumatic converter disclosed herein includes a passageway defined in a body between a supply port and an exhaust port. The supply port is to receive pressurized fluid from a supply pressure source and the exhaust port is to be vented to atmosphere. The electro-pneumatic converter includes an output port fluidly coupled to the passageway. The electro-pneumatic converter further includes an armature movable in the passageway between the supply port and the exhaust port. The armature is movable between a first position blocking the pressurized fluid from flowing in the passageway and creating a flow path between the output port and the exhaust port, and a second position blocking the exhaust port and creating a flow path for the pressurized fluid between the supply port and the output port.

An example method disclosed herein includes applying, via a controller, a first current to a solenoid in an electro-pneumatic converter, reducing, via the controller, the first current to a second current lower than the first current, and ceasing, via the controller, the application of the second current.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Electro-pneumatic converters (also referred to as electro-pneumatic transducers or latching pneumatic transducers) are used to convert an electrical input signal into a pneumatic pressure signal. In some examples, the electrical input signal is relatively small, such as on the order of milliamperes. Electro-pneumatic converters are often used in field instruments to provide a conversion of an electrical signal to a volumetric flow or pressure to control a process control device. In some instances, the output pressure or flow is amplified (e.g., via a relay) and used to operate a process control device, such as an actuator, to change a position or state of a valve.

Known electro-pneumatic converters typically utilize a complex system of pressure cavities, beams and nozzles to convert an electrical signal into a pneumatic output signal. These systems are often large and require a relatively large amount of space to be implemented. Also, many known electro-pneumatic converters consume or bleed air constantly during operation, which is expensive and wasteful to the environment.

Disclosed herein are example electro-pneumatic converters having optimized geometry that are smaller and which consume less power than known converters. In general, the example electro-pneumatic converters disclosed herein are to be fluidly coupled between a supply pressure source that supplies pressurized fluid and a downstream device, such as a pneumatic relay, that uses the pressurized fluid to control a process control device (e.g., an actuator). The example electro-pneumatic converters control the flow of the pressurized fluid between the supply pressure source and the downstream device. In particular, the example electro-pneumatic converters operate between a closed state (sometimes referred to as off or unlatched) and an open state (sometimes referred to as on or latching). In the closed state, no pressurized fluid is provided to the downstream device. In the open state, an electrical signal in the form of a current is applied to the electro-pneumatic converter, which allows the flow of pressurized fluid to the downstream device and, thus, converts an electrical input signal into a pneumatic pressure signal.

Example electro-pneumatic converters disclosed herein utilize a solenoid having a coil and a movable armature to control the flow of pressurized fluid between a supply port and one or more output port(s). In some examples, the electro-pneumatic converter includes an axial passageway between the supply port and an exhaust port. The one or more output ports are fluidly coupled to the axial passageway and may be coupled to a downstream device, such as a pneumatic relay. The supply port is to receive pressurized fluid from the pressure supply source. The armature is disposed in and movable in the axial passageway between a first position blocking the pressurized fluid from flowing through the axial passageway between the supply port and the output port(s) and a second position allowing the pressurized fluid to flow through the axial passageway between the supply port and the output port(s). When the solenoid is activated, the armature moves from the first position to the second position to allow the pressurized fluid to flow to the output port(s). In the first position, when the supply port is blocked, the exhaust port is unblocked and the output ports(s) are fluidly coupled to the exhaust port (e.g., vented to atmosphere). In the second position, when the supply port is unblocked, the armature blocks the exhaust port, thereby enabling the pressurized fluid to flow from the supply port to the output port(s). The solenoid can be activated and deactivated to move the armature back-and-forth in the passageway between the first and second positions to control the flow of pressurized fluid to the output port(s). This geometry enables the armature to travel a relatively small distance between the first (closed) and second (open) positions. Thus, the example electro-pneumatic converters can be constructed to have a relatively small size.

In some examples, after the armature has been moved to the second (open) position, the current applied to the coil of the solenoid is reduced and maintained until the solenoid is to be deactivated. As a result, less power is used by the example converter to produce the same output pressure. Thus, the example electro-pneumatic converters disclosed herein have reduced power consumption. The example electro-pneumatic converters disclosed herein also have less bleed than known electro-pneumatic converters. In some instances, the example electro-pneumatic converters disclosed herein may achieve less than 0.1 square cubic feet per hour (SCFH) of air. As such, the example electro-pneumatic converters disclosed herein are more efficient than known electro-pneumatic converters.

Figure 1:
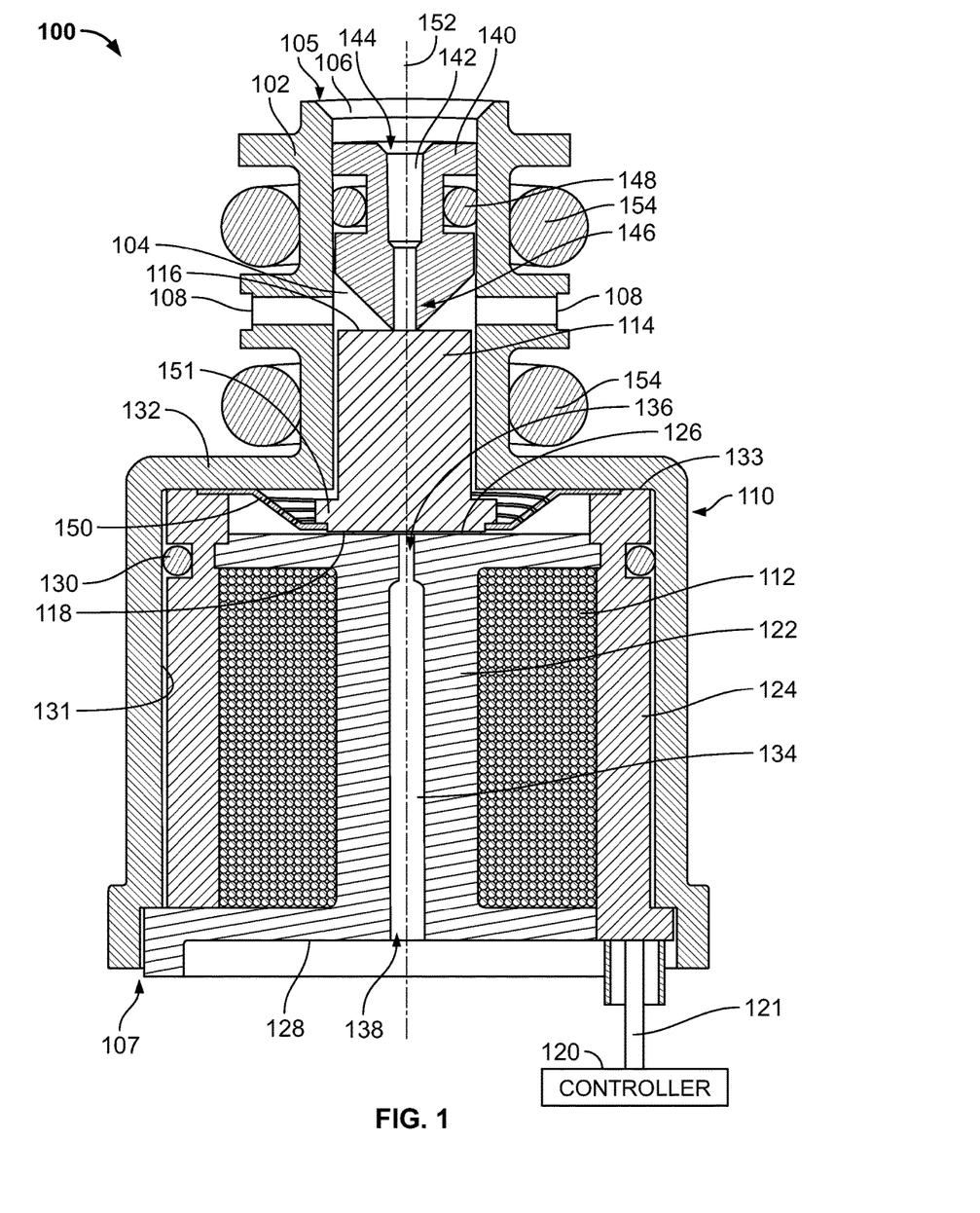
FIG. 1 is a cross-sectional view of an example electro-pneumatic converter having an example armature in a first (closed) position.

Turning now to the figures, FIG. 1 is a cross-sectional view of an example electro-pneumatic (I/P) converter 100 (referred to herein as the converter 100) constructed in accordance with one or more principles of this disclosure. The example converter 100 converts an electrical input signal into a pneumatic output signal (e.g., a pressure signal) by controlling the flow of pressurized fluid through the converter 100. In some examples, the pneumatic output signal is used to control a device, such as a pneumatic actuator for actuating a valve. In some examples, the pneumatic output signal is amplified via a pneumatic relay to a higher pressure and/or volumetric flow rate, which is then supplied to the actuator for actuating the valve, as disclosed in further detail in connection with FIG. 4.

In the illustrated example of FIG. 1, the converter 100 includes a body 102 defining an axial passageway 104 extending between a first opening 105 and a second opening 107. The first opening 105 is defined by a supply port 106 that is to be fluidly coupled to a supply pressure source (e.g., plant air, process gas, etc.). In the illustrated example, two output ports 108 are fluidly coupled to the passageway 104. The converter 100 operates to block or allow fluid flow between the supply port 106 and the output ports 108. The output ports 108 may be fluidly coupled to a downstream device that receives the pressurized fluid, which is considered a pneumatic output signal.

To control the flow of fluid between the supply port 106 and the output ports 108, the example converter 100 includes a solenoid 110 having a coil 112 and a movable armature 114 (e.g., a plug or plunger). The armature 114 is disposed in and movable within the passageway 104 between the first opening 105 and the second opening 107. The armature 114 has a first side 116 (e.g., a top side) that faces the supply port 106 and a second side 118 (e.g., a bottom side) that faces the solenoid 110. The armature 114 is movable between a first position (shown in FIG. 1, which may be referred to as an off position, a closed position or an unlatched position) in which the armature 114 blocks the flow of pressurized fluid through the passageway 104 between the supply port 106 and the output ports 108 and a second position (shown in FIG. 2, which may be referred to as an on position, an open position or a latching position) in which the armature 114 allows the flow of pressurized fluid through the passageway 104 between the supply port 106 and the output ports 108, as disclosed in further detail herein. In the illustrated example of FIG. 1, a controller 120 is electrically coupled to the coil 112 via wires 121. The controller 120 may activate the solenoid 110 by applying a current to the coil 112, as disclosed in further detail herein.

In the illustrated example, the solenoid 110 includes a core 122, around which the coil 112 is wrapped, and a sleeve 124. The core 122 and the coil 112 are disposed in the sleeve 124. The core 122 has a first side 126 (e.g., a top side) and a second side 128 (e.g., a bottom side) that form opposite sides of the solenoid 110. In the illustrated example, the solenoid 110 is disposed in the passageway 104 near the second opening 107. The solenoid 110 is disposed in a section of the passageway 104 having a larger diameter than the section of the passageway 104 near the first opening 105. In some examples, the solenoid 110 is press fit into the passageway 104 through the second opening 107. In the illustrated example, a seal 130 is disposed between the solenoid 110 and an inner wall 131 of the passageway 104. The seal 130 forms a fluid tight interface between the solenoid 110 and the body 102 and, thus, prevents the flow of fluid around the solenoid 110. In the illustrated example, a first side 133 of the sleeve 124 (e.g., a top side of the solenoid 110) is engaged with a wall 132 (e.g., a step) of the body 102 separating the smaller and larger sections of the passageway 104. In other examples, the first side 133 of the sleeve 124 may be separated from the wall 132. For example, the solenoid 110 may be formed with a ridge or lip that engages a corresponding lip formed on the inner wall 131 of the passageway (e.g., near the second opening 107), which may be advantageous during manufacturing and/or assembly. In the illustrated example, the core 122 of the solenoid 110 includes an exhaust passageway 134 between a first opening 136 (e.g., an exhaust port) in the first side 126 of the core 122 and a second opening 138 in the second side 128 of the core 122, disclosed in further detail herein.

In the illustrated example, a travel stop 140 is disposed in the passageway 104 near the supply port 106. The travel stop 140 has a travel stop passageway 142 between a first opening 144 and a second opening 146 in the travel stop 140. In the illustrated example, a seal 148 is disposed between the travel stop 140 and the inner wall 131 of the passageway 104 to prevent leakage by the travel stop 140. Thus, the flow of pressurized fluid into the passageway 104 is controlled through the travel stop passageway 142. The travel stop 140 may be adjusted to different locations in the passageway 104 to adjust the flow rate when the converter 100 is open or on, as discussed in further details herein. In some examples, the travel stop 140 is maintained in the passageway 104 via an interference fit. In other examples, travel stop 140 may be threaded into the passageway 104. In such an example, the travel stop 140 may be rotated in one direction or the other to adjust the location of the travel stop 140 in the passageway 104. In the illustrated example, the side of the travel stop 140 facing the armature 114 is conical-shaped. However, in other examples, the side of the travel stop 140 may be shaped differently.

In the off or closed position illustrated in FIG. 1, the solenoid 110 is not energized and the armature 114 is biased toward the supply port 106 via a spring 150. In the illustrated example, the spring 150 is disposed between the armature 114 and the solenoid 110. An outer portion (e.g., an outer circumference) of the spring 150 is captured between the sleeve 124 (e.g., a notch in the first side 133 of the sleeve 124) and the wall 132 of the body 102. An inner portion (e.g., an inner circumference) of the spring 150 is coupled to the armature 114 at or near the second side 118 of the armature. In the illustrated example, the inner portion of the spring 150 is engaged with a flange 151 of the armature 114 near the second side 118 of the armature 114. The spring 150 biases the armature 114 toward the travel stop 140. In the illustrated example, the spring 150 is a conical tension spring. However, in other examples, other types of springs may be implemented. Additionally, in other examples, the spring 150 may be disposed in other locations.

In the off or closed position illustrated in FIG. 1, the armature 114 blocks the flow of fluid from the supply port 106. More specifically, the armature 114 is engaged with the travel stop 140 and blocks the second opening 146, thereby blocking the flow of fluid through the travel stop passageway 142. As such, the armature 114 blocks the flow of pressurized fluid through the passageway 104 between the supply port 106 and the output ports 108. Further, in the off or closed position, the armature 114 is spaced apart from the first side 126 of the core 122 (e.g., the top side of the solenoid 110). In this position, the exhaust passageway 134 fluidly couples the passageway 104 to the atmosphere. As a result, a flow path is defined between the output ports 108 and exhaust passageway 134 (i.e., the output ports 108 are vented to atmosphere). Fluid may flow from the output ports 108, around the armature 114 (between the armature 114 and the inner wall 131 of the passageway 104), through the spring 150, between the second side 118 of the armature 114 and the first side 126 of the core 122, and through the exhaust passageway 134 to atmosphere. Therefore, any positive pressure at the output ports 108 (and/or a fluid line coupled to the output ports 108) is vented to atmosphere when the converter 100 is in the off or closed position.

Figure 2:
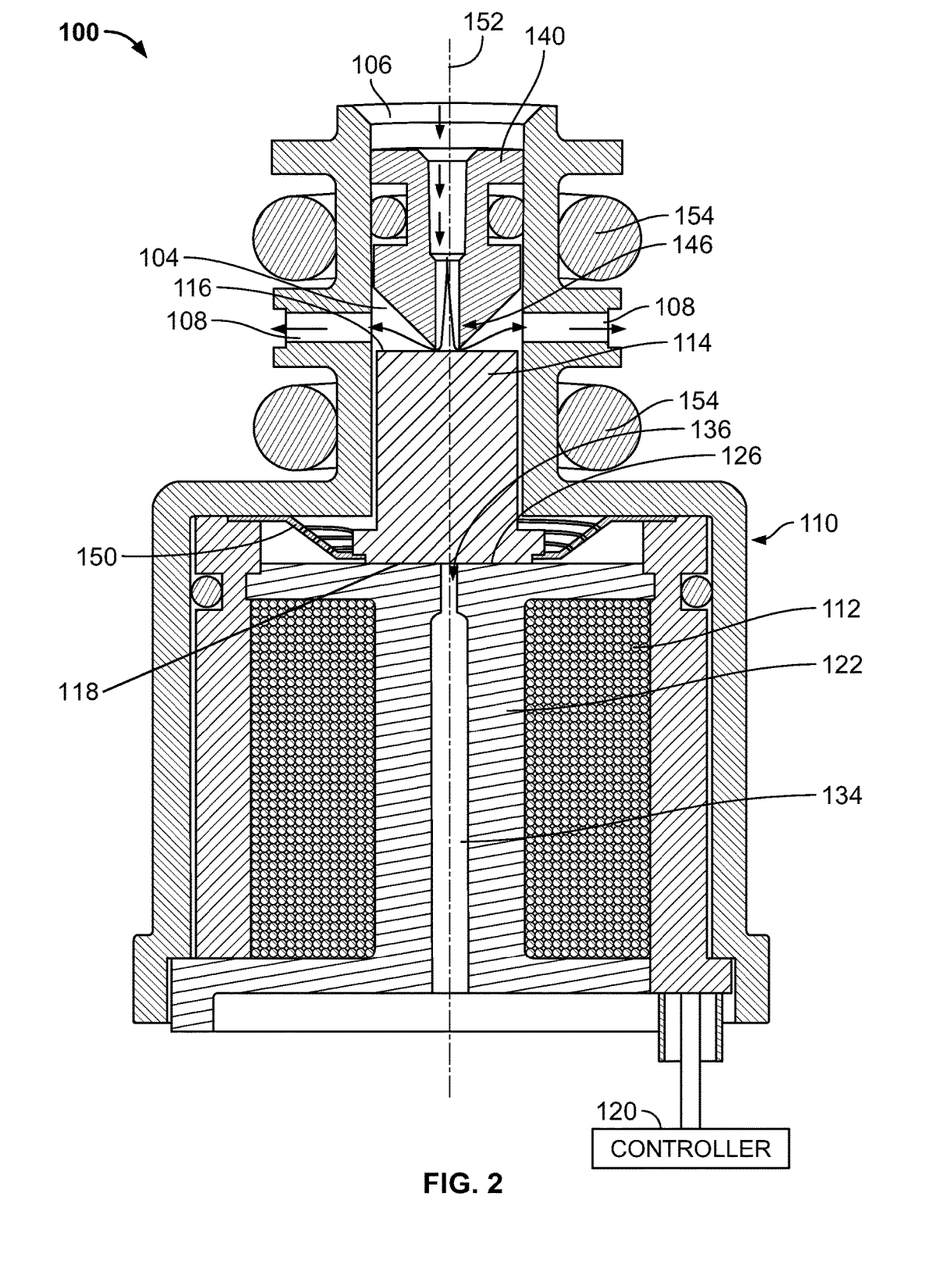
FIG. 2 is a cross-sectional view of the example electro-pneumatic converter of FIG. 1 with the example armature in a second (open) position.

To supply fluid from the supply port 106 to the output ports 108 (e.g., to generate a pneumatic output signal), the solenoid 110 may be turned on or activated by applying a current to the coil 112. FIG. 2 illustrates the example converter 100 when the solenoid 110 is activated. The core 122 may be constructed of a ferrous material (e.g., iron). The current in the coil 112 induces a magnetic field around the core 122. The armature 114, which is constructed of a metallic material (e.g., iron), is attracted to the core 122 and moves toward the first side 126 of the core 122. As a result, the armature 114 is moved away from the second opening 146 of the travel stop 140 and, thus, the pressurized fluid can flow through the passageway 104 from the supply port 106 to the output ports 108 (as shown by the arrows). Also, in the on or open position, the second side 118 of the armature 114 is engaged with the first side 126 of the core 122. In this position, the armature 114 closes the first opening 136 and, thus, blocks the exhaust passageway 134.

As illustrated in FIGS. 1 and 2, the armature 114 is movable along an axis 152 of the passageway 104 between the first position, blocking the supply port 106 (FIG. 1), and the second position, blocking the exhaust passageway 134 (FIG. 2). The supply port 106 and the exhaust passageway 134 are axially aligned with the passageway 104. This geometry enables the armature 114 to move a relatively small distance to control the flow of fluid through the converter 100. In particular, the armature 114 moves a relatively small distance between the first position (FIG. 1) and the second position (FIG. 2). In some examples, the armature 114 moves about 0.002 inches (in) (0.0508 millimeters (mm)). In other examples, the converter 100 may be designed such that armature 114 moves more or less in the passageway 104. As such, less space is needed to accommodate the armature travel and, thus, the converter 100 can be smaller than known converters. In some examples, the converter 100 is about 1 in (25.4 mm) in length. Thus, the example converter 100 can be used in a wider range of applications.

In the illustrated example of FIGS. 1 and 2, the output ports 108 extend from the passageway 104 in a direction that is perpendicular to the axis 152 of the passageway 104. In other examples, the output ports 108 may be oriented at a different angle relative to the axis 152. In the illustrated example, the converter 100 includes two output ports 108, which are disposed on opposite sides of the passageway 104. In other words, the output ports 108 extend from the passageway 104 in opposing directions. In some examples, by providing two opposing output flow paths, the fluid flowing through the travel stop 140 and past the armature 114 acts on the first side 116 (e.g., the top side) of the armature 114 in a symmetrical manner. In other words, the force acting on the first side 116 of the armature 114 from the flowing fluid is balanced. Otherwise, if only one output port is utilized, the fluid may bias the armature 114 to one side in the passageway 104, which, over time, may cause the armature 114 to become misaligned. In other examples, the converter 100 may include more (e.g., three, four, etc.) or fewer (e.g., one) output ports and the output port(s) may be disposed in other locations and/or oriented in other directions. In the illustrated example of FIG. 1, the first side 116 of the armature 114 is relatively flat or planar. As a result, if the armature 114 is moved laterally in the passageway 104 (toward the inner wall 131), the first side 116 of the armature 114 may still block the second opening 146 of the travel stop 144 when the armature 114 is moved back to the first position. In other examples, the first side 116 of the armature may be shaped differently.

The flow rate of the converter 100 can be changed by adjusting the position of the travel stop 140 in the passageway 104. For instance, if the travel stop 140 is moved further into the passageway 104 toward the solenoid 110, less space is created between the travel stop 140 and the armature 114 when the armature 114 moves to the second position (FIG. 2). As a result, the flow rate is decreased. On the other hand, if the travel stop 140 is moved away from the solenoid 110 in the passageway 104, then more space is created between the travel stop 140 and the armature 114 when the armature 114 moves to the second position (FIG. 2). As a result, the flow rate is increased. Thus, the example converter 100 can be easily calibrated to achieve a desired flow rate (e.g., which may correspond to the pneumatic output signal) by adjusting the position of the travel stop 140.

Once the desired pressure at the output ports 108 is reached, the controller 120 may deactivate the solenoid 110 by ceasing the application of the current to the coil 112, which allows the armature 114 to move (e.g., via the spring 150) back to the first position (FIG. 1) and block the flow of fluid to the output ports 108. Further, the exhaust passageway 134 is opened. As a result, any pressure at the output ports 108 is vented to atmosphere through the exhaust passageway 134. In some examples, the controller 120 may apply a reverse current to the coil 112, which creates an electromagnetic field in the opposite direction that repels or pushes the armature 114 toward the travel stop 140. The converter 100 may be activated and deactivated relatively quickly (e.g., via pulses of current) to produce small pneumatic output signals (e.g., pulses of air) at the output ports 108.

In the off or closed position (FIG. 1), the armature 114 substantially blocks the flow of pressurized fluid into the passageway 104. In some instances, only a relatively small amount of fluid is leaked into the passageway 104. In some examples, the converter 100 achieves an air consumption of less than 0.1 square cubic feet per hour (SCFH) of air at 20 pounds-per-square-inch (PSI). Thus, compared to known elector-pneumatic converters, the example converter 100 results in significantly less wasted bleed air.

In the illustrated example of FIGS. 1 and 2, the converter 100 includes seals 154 (e.g., o-rings) disposed around the body 102 near the output ports 108. The seals 154 may be used to fluidly seal the converter 100 in a bore or passageway of a controller, such as the valve controller 400 discussed in further detail in connection with FIG. 4 below.

In some examples, the controller 120 initially applies a higher current to the coil 112 to move the armature 114 to the second position (FIG. 2) and then reduces the current to a lower current. Once the armature 114 is moved closer to the core 122, less magnetic force is needed to keep the armature 114 in the second position. Thus, less current is needed to generate a magnetic field sufficient to hold the armature 114 in place. Therefore, the controller 120 reduces the current once the armature 114 is moved to the second position and, thus, reduces the total power consumed by the converter 100.

Figure 3:
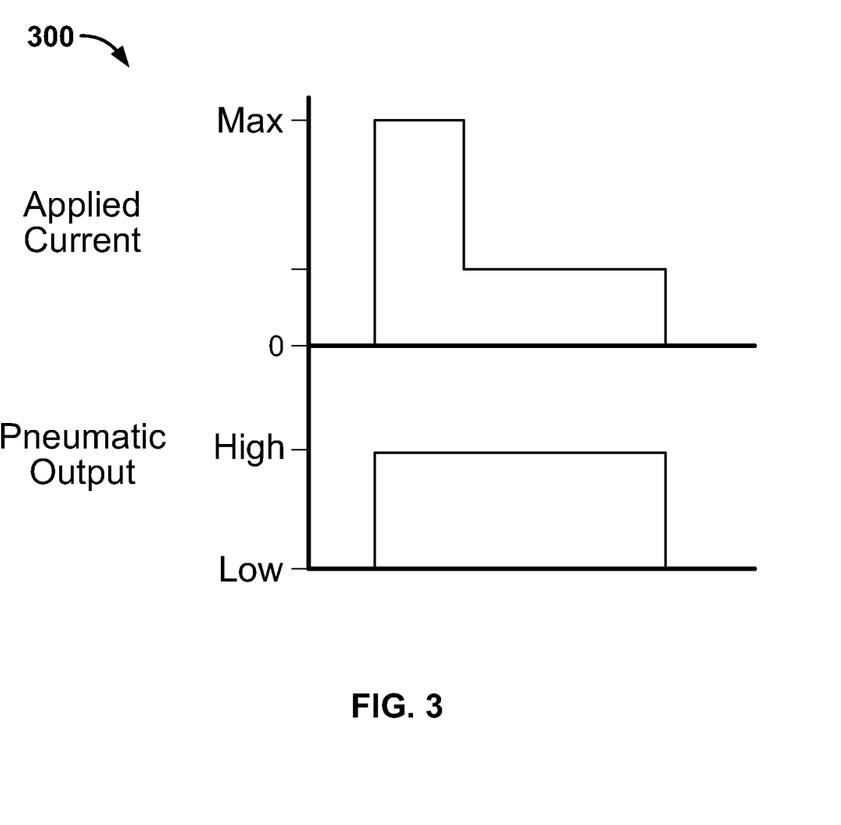
FIG. 3 is an example graph showing input current applied and output pressure achieved with the example electro-pneumatic converter of FIG. 1.

FIG. 3 illustrates an example graph 300 showing the applied current (top graph) and the corresponding pneumatic output (lower graph) produced by the example converter 100. As illustrated, when turning on the converter 100, the controller 120 applies a higher current to the coil 112 to move the armature 114 toward the solenoid 110 to overcome the bias of the spring 150. Once the armature 114 moves to the second position (FIG. 2), the flow path between the supply port 106 and the output ports 108 is opened, and a steady pneumatic output pressure is produced. Then, the applied current may be reduced. As mentioned above, once the armature 114 is near the core 122, the attractive force is stronger between the core 122 and the armature 114, so a lower magnetic field can be used to maintain the armature 114 in place. In some examples, the higher current is applied only for a period of time until the armature 114 is at or near the core 122, at which point the current can be reduced. By reducing the current, less energy is used to operate the example converter 100. In particular, even when the current is reduced, the output pressure remains constant. Thus, the example converter 100 is more energy efficient than known converters that apply the same high current throughout activation. In some examples, the high current signal is about 3 milliamperes and the low current signal is about 1 millliampere. The current may then be ceased, which causes the converter 100 to close and cease producing a pneumatic output pressure. Therefore, the converter 100 operates between three power states (off, high current, and low current) to produce two pneumatic output states (on or off).

In the illustrated example of FIG. 2, when the armature 114 is in the second position, the second side 118 of the armature 114 is engaged with the first side 126 of the core. In this position, a pressure differential is formed that biases the armature 114 toward the solenoid 110 (into the second position). In particular, the pressure of the fluid in the passageway 104 acts on the first side 116 (e.g., the top side) and the lateral sides of the armature 114, thereby forcing the armature 114 toward the solenoid 110, and the pressure in the exhaust passageway 134 (e.g., atmospheric pressure) acts on a relatively small area on the second side 118 (e.g., the bottom side) of the armature 114, thereby forcing the armature 114 in the opposite direction. In some instances, if the spring 150 does not produce enough counter force on the armature 114 to overcome the pressure of the fluid in the passageway 104 acting on the armature 114, the armature 114 may remain stuck in the second position even after the solenoid 110 is deactivated. In other words, when the solenoid 110 deactivated and the armature 104 is in the second position (FIG. 2), the pressure of the fluid in the passageway 104 acting on the first side 116 and the lateral sides of the armature 104 may be greater than the combined force of the spring 150 and the pressure in the exhaust passageway 134 acting on the second side 118 of the armature. As a result, this pressure difference maintains the armature 114 in the second position against the bias of the spring 150. Therefore, in some examples, a relief pattern may be used to enable the higher pressure air in the passageway 104 to act on the second side 118 of the armature, such that the pressure acting on all of the sides of the armature 114 is substantially balanced. This enables a relatively smaller, lighter spring 150 to be used.

Figure 4:
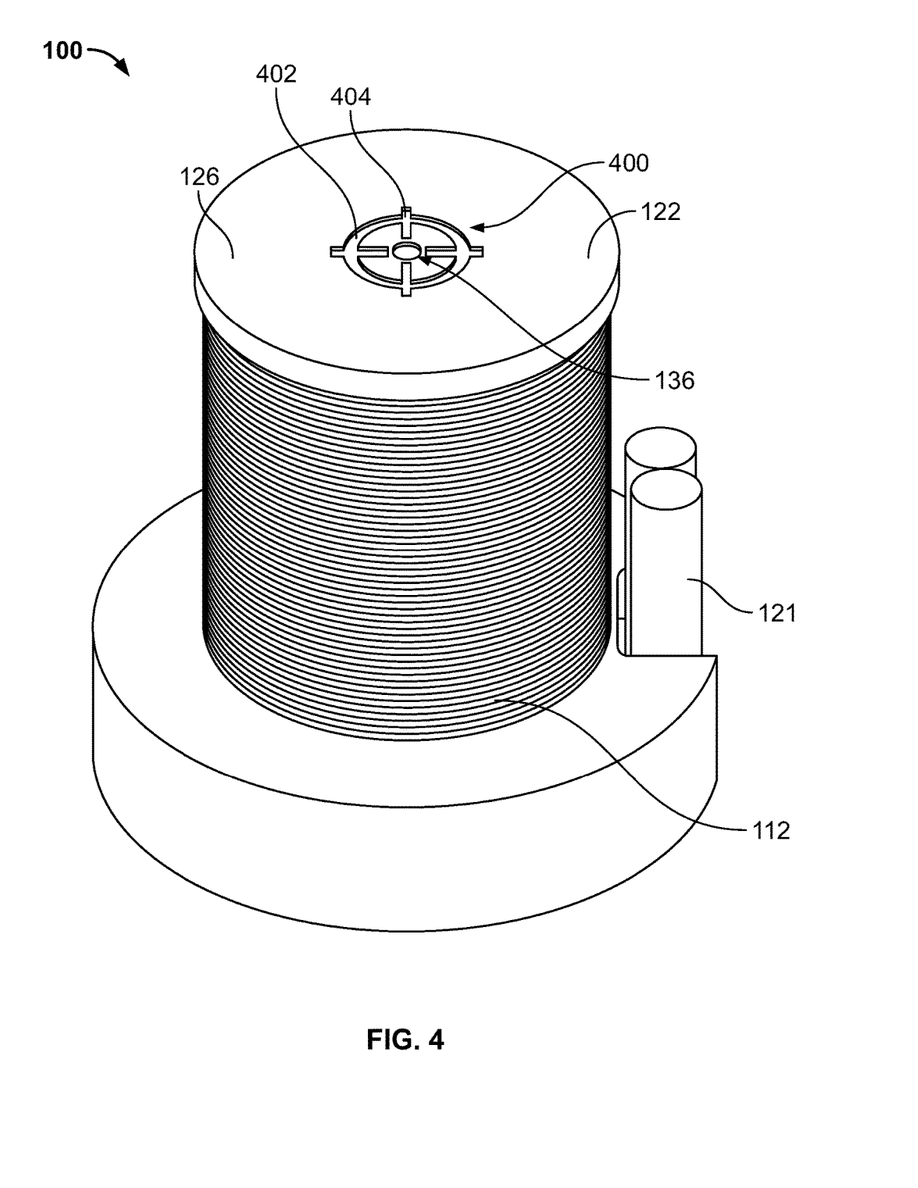
FIG. 4 is a perspective view of an example solenoid of the example electro-pneumatic converter of FIGS. 1 and 2 having an example relief pattern.

For example, FIG. 4 is a perspective view of the solenoid 110 without the sleeve 124 (FIG. 1). In the illustrated example, a relief pattern 400 is formed on the first side 126 of the core 122. The relief pattern 400 includes a series of grooves that form passageways between the second side 118 of the armature 114 (FIGS. 1 and 2) and the first side 126 of the core 122 when the armature 114 is in contact with the second side 126 of the core 122. In the illustrated example of FIG. 4, the relief pattern 400 includes a ring 402 and a plurality of lines 404 intersecting the ring 402 and extending radially outward. The lines 404 extend outward beyond a diameter of the second side 118 of the armature 114. As such, when the armature 114 is in contact with the first side 126 of the core, fluid from the passageway 104 (FIG. 2) can flow into the lines 404 and the ring 402. Thus, the pressure acting on the armature 114 from the passageway 104 is more balanced on all sides of the armature 114. As a result, a lighter, smaller spring 150 may be implemented, which decreases the overall weight, the size and the cost of the converter 100.

In the illustrated example of FIG. 4, the relief pattern 400 (including the ring 402 and the lines 404) is centered around (but not in contact with) the first opening 136 of the exhaust passageway 134 (FIG. 2). In other examples, the relief pattern 400 may be include more or fewer grooves and the groove(s) may be arranged in other designs or patterns. In other examples, no relief pattern may be used. Instead, a relatively stronger spring may be used that provides sufficient force to overcome the pressure acting on the armature 114. Also shown in FIG. 4 are the wires 112 (one of which is reference in FIG. 4) that connect the coil 112 to the controller 120 (FIGS. 1 and 2).

Figure 5:
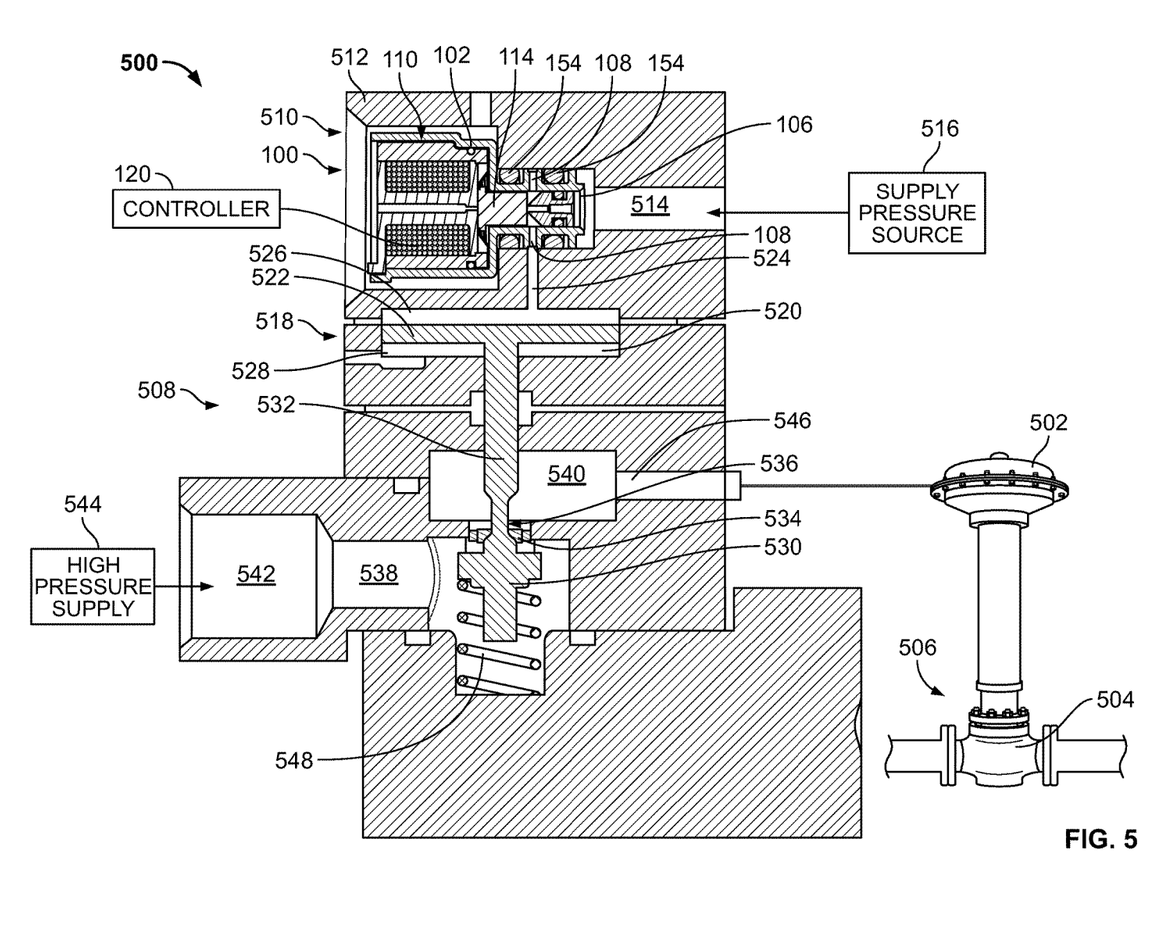
FIG. 5 is a cross-sectional view of an example valve controller implementing the example electro-pneumatic converter of FIG. 1 to operate an example actuator.

FIG. 5 illustrates an example valve controller 500 (e.g., a positioner) in which the example converter 100 may be implemented. In the illustrated example, the valve controller 500 controls an actuator 502 for operating a valve 504 that is installed in a fluid process system 506 (e.g., a distribution piping system) of a processing system or plant. In the illustrated example, the valve controller 500 has been cross-sectioned and is not to scale with respect to the actuator 502 and the valve 504. The valve controller 500 supplies high pressure fluid to the actuator 502 to operate the valve 504 (e.g., by moving a valve stem). In the illustrated example, the valve controller 500 includes an amplifier or relay 508. The converter 100 produces a pneumatic output signal, which is amplified by the relay 508 and provided to the actuator 502 for operating the valve 504 (e.g., opening or closing the valve 504).

In the illustrated example, the converter 100 is disposed within a bore 510 defined in a body 512 (e.g., a housing) of the valve controller 500. The seals 154 provide a fluid tight seal between the body 102 of the converter 100 and the body 512 of the valve controller 400. Further, the seals 154 define an annulus fluidly connecting the output ports 108 to a passage 524, discussed in further detail herein. In the illustrated example, the body 512 of the valve controller 400 includes a passageway 514 that fluidly couples a supply pressure source 516 (e.g., a low pressure source) to the supply port 106 of the converter 100. The converter 100 converts an electrical input signal into a pneumatic output signal by enabling the pressurized fluid to flow from the supply pressure source 516 through the converter 100 to the output ports 108. The supply pressure source 516 may be, for example, plant air (e.g., compressed fluid, such as air or natural gas, distributed through a processing plant), pressurized fluid from the fluid process system 506, and/or pressurized fluid any other source of fluid. In some examples, the supply pressure source 516 is drawn from the high pressure supply 544 disclosed below and regulated to a relatively lower pressure.

In the illustrated example of FIG. 5, the output ports 108 are fluidly coupled to an actuator 518 of the relay 508. The actuator 518 includes a chamber 520 and a piston 522 disposed in the chamber 520. A passageway 524 fluidly couples the output ports 108 to a first side 526 of the chamber 520 on one side of the piston 522. A second side 528 of the chamber 520 is vented to atmosphere. When pressurize is supplied to the first side 526 of the chamber 520, the piston 522 is moved downward in FIG. 5.

In the illustrated example, the piston 522 is coupled to a plug 530 (e.g., a flow control member) via a stem 532. The plug 530 is movable toward and away from a seat 534. In the illustrated example, the seat 534 is disposed around an orifice 536 between a relay input chamber 538 and a relay output chamber 540. The relay input chamber 538 is fluidly coupled via a passageway 542 to a high pressure supply 544, and the relay output chamber 540 is fluidly coupled via a passageway 546 to the actuator 502. The high pressure supply 544 may be, for example, plant air (e.g., compressed fluid, such as air or natural gas, distributed through a processing plant), pressurized fluid from the fluid process system 506, and/or pressurized fluid any other source of fluid source. The plug 530 is movable between a first position in which the plug 530 is engaged with the seat 534 and blocks the flow of pressurized fluid between the relay input chamber 538 and the relay output chamber 540 and a second position in which the plug 530 is moved away from the seat 534 and pressurized fluid can flow from the relay input chamber 538 to the relay output chamber 540 and, thus, to the actuator 502. The relay 508 includes a return spring 548 to bias the plug 530 to the first or closed position. In the illustrated example, the return spring 548 is disposed in the relay input chamber 538. However, in other examples, the return spring 548 may be disposed in other locations.

Described below is an example operation to supply high pressure fluid to the actuator 502 using the example valve controller 500. First, the controller 120 receives a pressure command (e.g., from a control room) and activates the converter 100 by applying a current (e.g., an electrical input signal) to the solenoid 110. When activated, the solenoid 110 creates a magnetic field that attracts the armature 114, which moves the armature 114 away from the travel stop 140 (as illustrated in the position in FIG. 2). As a result, pressurized fluid from the supply pressure source 516 flows through the passageway 104 (FIG. 1) in the converter 100 between the supply port 106 and the output ports 108. The pressurized fluid flows through the passageway 524 to the first side 526 of the chamber 520 of the actuator 518. The higher pressure in the first side 526 of the chamber 520 causes the piston 522 to move downward in FIG. 5. As a result, the plug 530 is moved away from the seat 534, which enables high pressure fluid to flow from the high pressure supply 544 to the actuator 502.

When the desired pressure is reached and/or the actuator 502 is to be stopped, the controller 120 deactivates the solenoid 110 by ceasing the application of current to the solenoid 110. As a result, the spring 150 (FIG. 1) moves the armature 114 back into engagement with the travel stop 140 (FIG. 1), which blocks the flow of fluid through the passageway 104 (FIG. 1) between the supply port 106 and the output ports 108, as illustrated in the position shown in FIG. 1. The passageway 104 (FIG. 1) fluidly couples the output ports 108 to the first opening 136 (e.g., the exhaust port) (FIG. 1) in the core 122 (FIG. 1). Thus, the pressurized fluid in the passageway 524 (and the first side 526 of the chamber 520) is vented to atmosphere. As a result, the pressures in the first side 526 and the second side 528 of the chamber 520 stabilize, and the return spring 548 moves the plug 530 back into the first position in engagement with the seat 534, thereby blocking the flow of high pressure fluid to the actuator 502. Thus, the converter 100 converts a relatively small electrical input signal (e.g., 1-3 milliamperes) into a pneumatic output signal (at the output ports 108), which is then amplified and used to control the actuator 502. The converter 100 can be turned on and off relatively quickly to provide small increments of pressurized fluid to the actuator 502, which enables relatively high precision of actuation.

In some examples, one converter and relay are used to supply high pressure fluid to the actuator 502 to operate the valve 504 in one direction (e.g., to open the valve 504), and a separate converter and relay are used to relieve the high pressure fluid from the actuator 502 to operate the valve 504 in the opposite direction (e.g., to close the valve 504). The relief converter and relay may be configured similar to the converter 100 and relay 508 in FIG. 5. However, the relay input chamber 538 is instead vented to atmosphere. As such, when the converter 100 opens the relay 508 (by moving the plug 530 away from the seat 534), the high pressure fluid in the relay output chamber 540 (from the actuator 502) is to vented to atmosphere, thereby relieving the pressure in the actuator 502 and enabling the valve 504 to be operated in the other direction. In some examples, the controller 120 controls both converters. In other examples, separate controllers may be implemented to control the respective converters.

While in the illustrated example of FIG. 5 the converter 100 and the relay 508 are integrated into the same body 512, in other examples the converter 100 and the relay 508 may be disposed in separate bodies and fluidly coupled via one or more conduits. In the illustrated example, the body 512 is constructed of multiple bodies or housings that are coupled together. In other examples, the body 512 may be a substantially unitary part or component.

Figure 6:
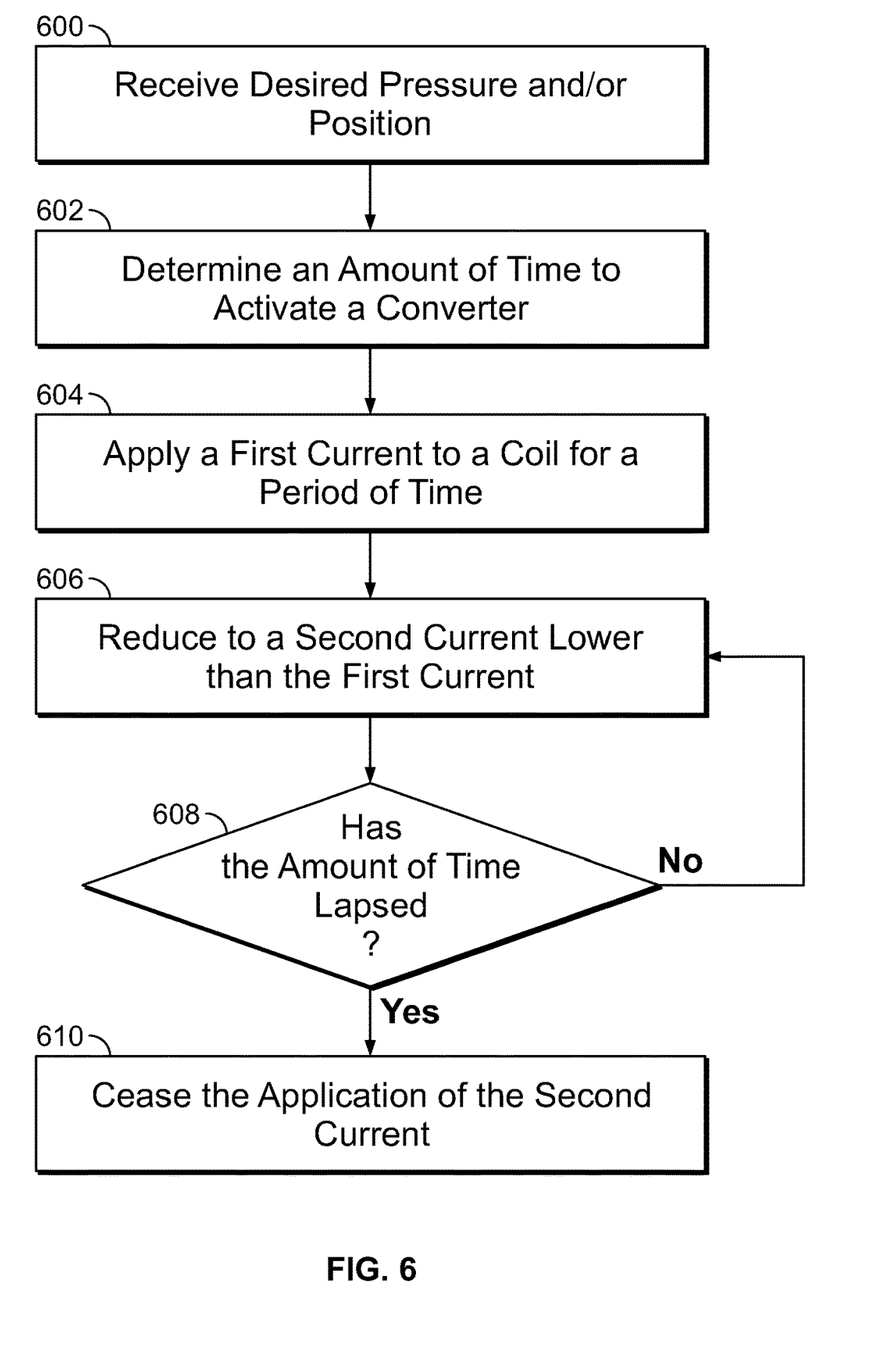
FIG. 6 is a flowchart representative of an example method that may be implemented by an example controller to activate the example electro-pneumatic converter of FIG. 1.

FIG. 6 is a flowchart representative of an example method that may be performed by the example controller 120 for activating the converter 100 and converting an electrical input signal into a pneumatic output signal. At block 600 the controller 120 receives a desired pressure and/or position to be achieved. For example, the controller 120 may receive a desired pressure to be supplied to the actuator 502 (for actuating the valve 504) and/or may receive a desired position of the actuator 502 and/or the valve 504. At block 602, the controller 120 determines an amount of time to activate the converter 100 to reach the desired pressure and/or position. At block 604, the controller 120 applies a first current to the coil 112 of the solenoid 110. As such, the controller 120 opens the converter 100 by activating the solenoid 110, which moves the armature 114 away from the travel stop 140 and enables pressurized fluid (e.g., a pneumatic output signal) to be supplied to the output ports 108. In some examples, the first current is applied for a predetermined period of time. For example, as illustrated in FIG. 3, a higher current (e.g., at or near max) may be applied to the coil 112 for a period of time (e.g., the time it takes until the armature 114 is in the second position (FIG. 2)). Then, at block 606, the controller 120 reduces the applied current from the first current to a second current, which is lower than the first current. For example, referring back to FIG. 3, the applied current is reduced to a second, lower current. The second current is sufficient to maintain the armature 114 in the open position and enable fluid to flow to the output ports 108. As illustrated in FIG. 3, even when the current is reduced, the output pressure remains constant.

At block 608, the controller 120 determines whether the amount of time has lapsed since the converter 100 was activated (opened, unlatched, etc.) at block 604. If the amount of time has not lapsed, the controller 120 continues to apply the second current to the coil 112, which maintains the converter 100 in the open state. Once the controller 120 determines the amount of time has lapsed, at block 608, the controller 120 deactivates the solenoid 110 by ceasing the application of the second current to the coil 112, at block 610. In some examples, the controller 120 applies another current (e.g., a third current) in the reverse direction to the coil 112 to move the armature 114 back to the first position (the closed position). In some examples, after ceasing activation of the solenoid 110, the controller 120 determines whether the desired pressure and/or position has been reached. If not, the example process of FIG. 6 may begin again. Additionally or alternatively, if the controller 120 receives a new desired pressure and/or position, the example process of FIG. 6 may begin again. Thus, the example process of FIG. 6 may be repeated any number of times. In other examples, the controller 120 may activate or move the converter 100 to the open state and monitor the pressure and/or position. Once the desired pressure and/or position is reached, the controller 120 may deactivate or more the converter 100 to the closed state. The example process may be used to supply pressure to an actuator or relieve pressure from an actuator, depending on the setup of the relay, as disclosed above in connection with FIG. 5.

From the foregoing, it will be appreciated that the above disclosed electro-pneumatic converters reduce power consumption by employing a more efficient geometry than known converters. In particular, the armature is arranged to move in a linear direction, which enables a relatively small movement (e.g., about 0.002 in) to open and close the converter. Additionally, the geometry allows for simpler assembly and calibration. For example, the flow rate of the example converter can be easily adjusted by moving the travel stop in the passageway. Further, the armature is arranged such that the current applied to the solenoid can be reduced while the converter remains open. Thus, the example converters use less power than known converters. Moreover, with a reduced armature travel distance, the example converters can have a relatively small dimensional envelope. In some examples, the converter may be less than 1 in in length (e.g., from the first opening 105 to the second opening 107). The example converters disclosed herein also have less bleed than known converters.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electro-pneumatic converter comprising:
an axial passageway defined in a body between a first opening and a second opening, a supply port formed by the first opening, the supply port to receive pressurized fluid from a pressure supply source;
an output port fluidly coupled to the axial passageway;
a solenoid disposed within the axial passageway, the solenoid including a core and a coil wrapped around the core, the core having a first side, a second side opposite the first side, and an exhaust passageway formed between the first side and the second side; and
an armature disposed in and movable in the axial passageway, the armature having a first side and a second side opposite the first side of the armature, the second side of the armature facing the first side of the core, the armature movable between (1) a first position in which the armature blocks the pressurized fluid from flowing through the axial passageway between the supply port and the output port and in which the second side of the armature is spaced apart from the first side of the core such that a flow path is defined between the output port and the exhaust passageway, and (2) a second position in which the armature allows the pressurized fluid to flow through the axial passageway between the supply port and the output port and in which the second side of the armature is engaged with the first side of the core and blocks the exhaust passageway, the first side of the core including a relief pattern to enable the pressurized fluid in the axial passageway to flow between the second side of the armature and the first side of the core when the armature is in the second position to reduce a pressure difference acting on the armature, the relief pattern including a groove formed in the first side of the core, the groove separate from an opening of the exhaust passageway formed in the first side of the core.

2. The electro-pneumatic converter of claim 1, further including a travel stop disposed in the axial passageway near the supply port, a travel stop passageway defined through the travel stop, wherein, in the first position, the first side of the armature is engaged with the travel stop to block the pressurized fluid from flowing through the travel stop passageway and, in the second position, the first side of the armature is spaced apart from the travel stop to allow the pressurized fluid to flow through the travel stop passageway.

3. The electro-pneumatic converter of claim 1, wherein the solenoid is disposed in the axial passageway near the second opening, and wherein the exhaust passageway fluidly couples the axial passageway to atmosphere when the armature is in the first position.

4. The electro-pneumatic converter of claim 1, wherein the exhaust passageway is axially aligned with the axial passageway.

5. The electro-pneumatic converter of claim 1, further including a spring to bias the armature to the first position.

6. The electro-pneumatic converter of claim 5, wherein the spring is disposed in the axial passageway between the armature and the solenoid.

7. The electro-pneumatic converter of claim 1, wherein the output port extends from the axial passageway in a direction that is perpendicular to the axial passageway.

8. The electro-pneumatic converter of claim 1, wherein the output port is a first output port, further including a second output port fluidly coupled to the axial passageway, the second output port extending from the axial passageway in a direction opposite to the first output port.

9. The electro-pneumatic converter of claim 1, further including a controller to activate the solenoid, wherein, when the solenoid is activated, the armature is moved to the second position, and when the solenoid is deactivated, the armature is moved to the first position.

10. The electro-pneumatic converter of claim 9, wherein the controller is configured to activate the solenoid by applying a first current to the coil for a period of time and then applying a second current to the coil, the second current less than the first current.

11. The electro-pneumatic converter of claim 1, wherein the groove includes a ring and a line intersecting the ring, the line extending radially outward beyond a diameter of the second side of the armature.

12. The electro-pneumatic converter of claim 1, wherein the relief pattern is centered around the opening of the exhaust passageway formed in the first side of the core.

13. The electro-pneumatic converter of claim 6, wherein an outer circumferential portion of the spring is captured between the solenoid and a wall of the body, and an inner circumferential portion of the spring is coupled to the armature at or near the second side of the armature.

14. The electro-pneumatic converter of claim 13, wherein the spring is a conical tension spring.

15. An electro-pneumatic converter comprising:
a passageway defined in a body between a supply port and an exhaust port, the supply port to receive pressurized fluid from a supply pressure source and the exhaust port to be vented to atmosphere;
an output port fluidly coupled to the passageway;
a solenoid disposed in the passageway;
an armature movable in the passageway between the supply port and the exhaust port, the armature having a first side and a second side opposite the first side, the second side of the armature facing the solenoid, the armature movable between a first position blocking the pressurized fluid from flowing in the passageway and creating a flow path between the output port and the exhaust port, and a second position blocking the exhaust port and creating a flow path for the pressurized fluid between the supply port and the output port, wherein, in the second position, the second side of the armature abuts the solenoid; and
a spring to bias the armature to the first position, the spring having an outer circumferential portion and an inner circumferential portion, the outer circumferential portion coupled between the solenoid and a wall of the body, and the inner circumferential portion coupled to the armature at or near the second side.

16. The electro-pneumatic converter of claim 15, wherein, when the solenoid is energized, the armature moves from the first position to the second position.

17. The electro-pneumatic converter of claim 15, wherein the solenoid includes a coil wrapped around a core, wherein the exhaust port is formed in the core, and wherein, in the second position, the second side of the armature abuts the core to block the exhaust port.

18. The electro-pneumatic converter of claim 15, wherein the output port extends from the passageway in a direction that is perpendicular to an axis of the passageway.

19. The electro-pneumatic converter of claim 15, wherein the armature includes a flange near the second side of the armature, the inner circumferential portion of the spring is engaged with the flange.

20. The electro-pneumatic converter of claim 15, wherein the spring is a conical tension spring.

* * * * *